3,651,141
2,6-DI(LOWER ALKANOYLAMINO)-3,4-DICHLOROPHENOLS

Eugene E. Galantay, Morristown, N.J., assignor to Sandoz-Wander, Inc., Hanover, N.J.
No Drawing. Filed Aug. 8, 1969, Ser. No. 848,697
Int. Cl. C07c *103/38*
U.S. Cl. 260—562 A          4 Claims

ABSTRACT OF THE DISCLOSURE 2,6 - di(loweralkanoylamino) - 3,4 - dichlorophenols, e.g., 2,6-diacetamino-3,4-dichlorophenol. The compounds are useful as herbicides, bacteriostats, mold inhibitors and preservatives.

---

This invention relates to 2,6-di(loweralkanoylamino)-3,4-dichlorophenols, and to a process for their preparation.

The compounds of this invention may be represented by the following structural formula:

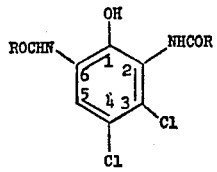

wherein R is lower alkyl having 1 to 3 carbon atoms, e.g., methyl, ethyl, propyl, and isopropyl.

The process for preparing the compounds of Formula I may be represented by the following reaction scheme A:

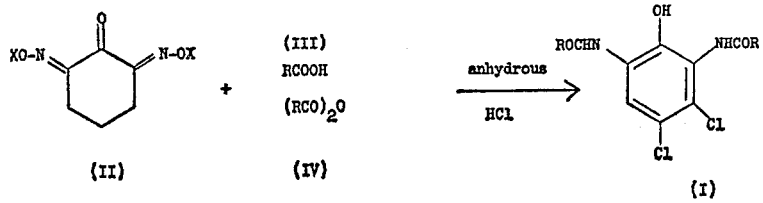

Compounds (I) wherein R has the above-stated significance are prepared by treating a compound of Formula II or its acid addition salt, where each X is, independently, hydrogen, alkali metal, e.g., Li, Na, K and the like, alkali earth metals, e.g., Ca, Sr, Ba, or lower acyl having 2 to 4 carbon atoms, with a lower alkyl carboxylic acid (III) and a lower alkyl carboxylic anhydride (IV) wherein R has the above-stated significance in the presence of anhydrous hydrogen chloride at temperatures from about 50° to 130° C. preferably from about 60° to 90° C. In the reaction, compound (III) is utilized as a solvent; however, inert co-solvents such as benzene, toluene and the like may also be used.

The molar ratio of compound (III) to compound (IV) is not critical, except that a minimum of 4 molar equivalents of compound (IV) to one molar equivalent of compound (II) is necessary. A minimum of 4 moles of anhydrous hydrogen chloride are necessary; however, an excess is preferred. The anhydrous hydrogen chloride in the reaction partially reacts with compound (III) to form the compound RCOCl (V) wherein R has the above-stated significance, and it will be appreciated by one skilled in the art that the anhydrous hydrogen chloride may be replaced by compound (V).

It is understood by one skilled in the art that compound (II) where X equals alkali metal or alkali earth metal in process A is first transformed into X equals hydrogen which in turn is transformed into X equals lower acyl at which point the N—O fission accompanied by aromatization and Cl⊖ ion addition takes place. Therefore, the compounds (II) where X has the abovestated significance can be utilized in process A as starting materials.

Certain of the compounds of Formula II are known and may be prepared by methods disclosed in the literature. Those compounds of Formula II which have not been specifically disclosed may be prepared by analogous methods from known materials. Standard techniques, e.g., crystallization, may be used to recover the compounds (I).

Compounds

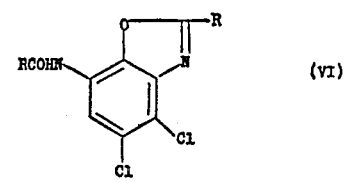

wherein R has the above-stated significance are also produced by the process A. Compounds (VI) may be converted into compounds (I) by treatment with super heated steam for about 30 minutes to about 5 hours.

The compounds of Formula I are useful as herbicides, bacteriostats, mold inhibitors and preservatives. The compounds of Formula I may be applied in a similar manner to the known compound 3',4'-dichloropropionanilide as described in Herbicide Handbook of the Weed Society of America, W. F. Humphrey Press Inc. Geneva, N.Y. (1967) p. 117.

EXAMPLE 1

2,6-diacetamino-3,4-dichlorophenol

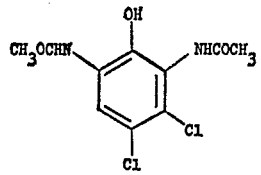

Step 1: At 76° C., a vigorous stream of hydrogen chloride is introduced into a mixture of 3 liters of acetic acid and 1 liter of acetic anhydride. After 30 minutes, the gas stream is slowed and after an additional 10 minutes, 396 g. of bis-oximino cyclohexanone diacetate is added. The temperature is controlled so as not to exceed 90° C. After the addition is finished, the mixture is held at 90° C. for 30 minutes, after which most of the acetic acid-anhydride mixture is stripped off in vacuo.

Step 2: The residue is then heated with 10 liters of 5 N aqueous NaOH solution to 80° C., until almost complete dissolution occurs. The resulting solution is filtered, washed 3 times with 200 ml. of chloroform, stirred with 100 g. of charcoal, filtered and acidified with 11 N HCl to a pH of 2, whereupon the product 2,6-diacetamino-3,4-dichlorophenol separates, is filtered off and washed thoroughly with water. After drying, the yellow solid melts at 230°–234° C. (dec.).

EXAMPLE 2

2,6-diacetamino-3,4-dichlorophenol

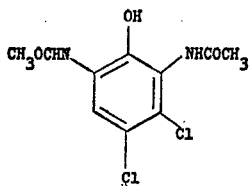

Bis-oximino cyclohexanone (10.5 g.) is dissolved in a mixture of 40 ml. of acetic anhydride and 100 ml. of acetic acid and the temperature raised to 65° C. Acetyl chloride (25 g.) is then added dropwise and the temperature allowed to rise to 80° C. After cooling the reaction mixture is washed up as described in Example 1, Step 2, and the product 2,6-diacetamino-3,4-dichlorophenol obtained.

EXAMPLE 3

2,6-dipropionylamino-3,4-dichlorophenol

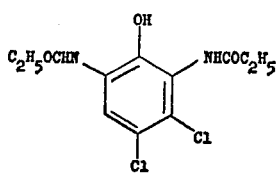

Following the procedure of Example 2 and in place of the acetic acid, acetic anhydride, and acetyl chloride, using propionic acid, propionic anhydride and propionyl chloride, the product 2,6-dipropionylamino-3,4-dichlorophenol is obtained.

EXAMPLE 4

2,6-diisobutyrylamino-3,4-dichlorophenol

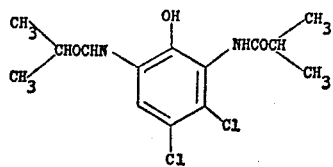

Following the procedure of Example 2 and in place of the acetic acid, acetic anhydride, and acetyl chloride, using isobutyric acid, isobutyric anhydride and isobutyryl chloride, the product 2,6 - diisobutylamino-3,4-dichlorophenol is obtained.

EXAMPLE 5

2-methyl-4,5(or 5,6)-dichloro-1-acetamidobenzoxazle

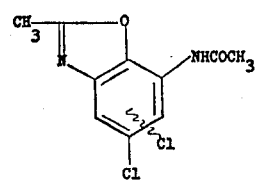

The reaction mixture obtained in Example 1, Step 1, is chromatographed using a silica gel column and chloroform-methanol (98:2) mixture as the eluent. The product, 2 - methyl-4,5(or 5,6)-dichloro-1-acetamidobenzoxazole is then eluted and recrystallized from ethyl acetate; M.P. 148°–150° C.

Upon heating the title product with water in a sealed tube to 160° C., the product 2,6-diacetamino-3,4-dichlorophenol is obtained.

What is claimed is:
1. A compound of the formula:

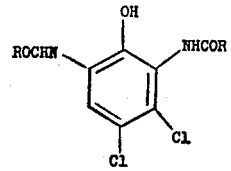

where R is lower alkyl having 1 to 3 carbon atoms.

2. The compound of claim 1 which is 2,6-diacetamino-3,4-dichlorophenol.

3. The compound of claim 1 which is 2,6-dipropionylamino-3,4-dichlorophenol.

4. The compound of claim 1 which is 2,6-diisobutyrylamino-3,4-dichlorophenol.

References Cited

UNITED STATES PATENTS 3,235,456  2/1966  Thominet et al. _____ 260—567

HENRY R. JILES, Primary Examiner

H. I. MOATZ, Assistant Examiner

U.S. Cl. X.R.

260—307 D, 566 A; 424—324; 71—118